United States Patent
Burugupalli et al.

(10) Patent No.: US 10,075,817 B1
(45) Date of Patent: Sep. 11, 2018

(54) UE MOTION ESTIMATE IN UNCONVENTIONAL CELL DEPLOYMENTS

(71) Applicant: Apple Inc., Cupertino, CA (US)

(72) Inventors: Srinivas Burugupalli, Union City, CA (US); Venkateswara Rao Manepalli, Sunnyvale, CA (US); Vijay Kumar Ramamurthi, Milpitas, CA (US); Ozgur Ekici, Ottawa (CA); Sree Ram Kodali, Sunnyvale, CA (US); Xin Wang, Cupertino, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/669,622

(22) Filed: Aug. 4, 2017

(51) Int. Cl.
*H04W 52/02* (2009.01)
*H04W 4/029* (2018.01)
*H04W 4/02* (2018.01)
*H04W 4/04* (2009.01)

(52) U.S. Cl.
CPC ........... *H04W 4/029* (2018.02); *H04W 4/028* (2013.01); *H04W 4/046* (2013.01); *H04W 52/0274* (2013.01)

(58) Field of Classification Search
CPC .... H04W 36/32; H04W 48/16; H04L 1/1854; H04L 1/1887
See application file for complete search history.

(56) References Cited

U.S. PATENT DOCUMENTS

| 6,564,042 | B1 | 5/2003 | Jou et al. |
|---|---|---|---|
| 8,989,789 | B2 | 3/2015 | Turkka et al. |
| 8,996,011 | B2 | 3/2015 | Lunden et al. |
| 9,055,474 | B2 | 6/2015 | Heo et al. |
| 9,179,290 | B2 | 11/2015 | Wager et al. |
| 9,674,813 | B2 | 6/2017 | Jeong |
| 2004/0208144 | A1* | 10/2004 | Vinayakray-Jani ......... H04W 48/18 370/331 |
| 2008/0014881 | A1 | 1/2008 | Engdahl et al. |
| 2009/0322603 | A1 | 12/2009 | Liao |
| 2010/0159950 | A1 | 6/2010 | Toh |
| 2010/0216406 | A1 | 8/2010 | Park et al. |
| 2011/0287778 | A1 | 11/2011 | Levin et al. |
| 2014/0206382 | A1 | 7/2014 | Shabtay |
| 2014/0220979 | A1 | 8/2014 | Song et al. |
| 2014/0274009 | A1 | 9/2014 | Do et al. |

(Continued)

*Primary Examiner* — Charles Appiah
*Assistant Examiner* — Edward Zhang
(74) *Attorney, Agent, or Firm* — Meyertons Hood Kivlin Kowert & Goetzel, P.C.; Jeffrey C. Hood; Brian E. Moore

(57) ABSTRACT

Some embodiments relate to a user equipment device (UE), and associated methods for enabling the UE to estimate motion of the UE based on cell type. In some embodiments, in response to determining that a serving cell of the UE is not a macro cell, a motion estimation algorithm may be disabled for at least a first time period and when the first time period lapses, the motion estimation algorithm may be partially enabled to estimate speed of the UE for at least a second time period. In response to the speed of the UE remaining above a speed threshold for at least the second time period, the motion estimation algorithm may be fully enabled. In response to the speed of the UE not remaining above the speed threshold for at least the second time period, the motion estimation algorithm may be disabled for at least a third time period.

20 Claims, 7 Drawing Sheets

(56) References Cited

U.S. PATENT DOCUMENTS

| | | | |
|---|---|---|---|
| 2015/0271639 A1* | 9/2015 | Ziskind | H04W 4/021 455/456.1 |
| 2015/0309184 A1* | 10/2015 | Viscovic | A61N 5/1001 600/1 |
| 2015/0312719 A1 | 10/2015 | Cho | |
| 2015/0334626 A1 | 11/2015 | Chen et al. | |
| 2016/0165548 A1 | 6/2016 | Mohlmann | |
| 2016/0373994 A1 | 12/2016 | Yiu et al. | |

* cited by examiner

UE MOTION ESTIMATE IN UNCONVENTIONAL CELL DEPLOYMENTS

FIELD

The present application relates to wireless communication, including providing improved motion estimation in unconventional cell deployments.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets, which users often carry on their person or hold. In many instances, motion estimation may be used by a mobile electronic device for calorimetry, motion activity alarms, in vehicle reminders, remember vehicle parking location, and so forth. Motion estimation may be based on internal sensor data and/or global positioning data. However, these estimations may have difficulty classifying non-periodic events like cycling, driving, and/or transit detection. In addition, these estimations may not accurately detect a cycling versus a driving scenario. Further, these estimations may have difficulty in unconventional cell deployments, such as femto and/or pico cells as well as small cells. Hence, it would be desirable to provide improved motion estimation capabilities. Thus, improvements in the field are desirable.

SUMMARY

Embodiments are presented herein of, inter alia, a user equipment device (UE), and associated methods for enabling the UE to estimate velocity (or motion) of the UE based (at least in part) on cell type. In some embodiments, in response to determining that a current cell serving the UE is not a macro cell, the UE may be configured to disable a motion estimation algorithm. In some embodiments, the UE may be configured to determine the current (or serving) cell is not a macro cell (or is a pico/femto or small cell) based, at least in part, on one or more parameters received from the current cell. In some embodiments, the disablement of the motion estimation algorithm may be for at least a first time period.

In some embodiments, subsequent to the first time period lapsing, the UE may be configured to partially enable the motion estimation algorithm to estimate speed of the UE. The partial enablement of the motion estimation algorithm may allow the speed of the UE to be estimated for at least a second time period. In some embodiments, in response to the speed of the UE remaining above a speed threshold for at least the second time period, the UE may be configured to fully enable the motion estimation algorithm. In some embodiments, in response to the speed of the UE not remaining above the speed threshold for at least the second time period, the UE may be configured to disable the motion estimation algorithm for at least a third time period.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
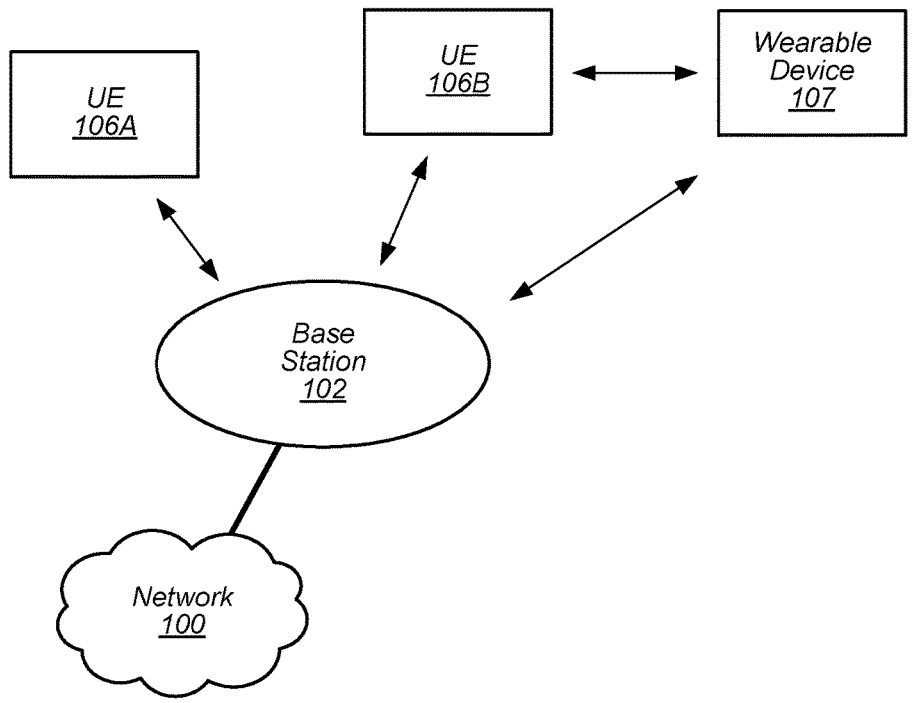
FIG. 1 illustrates an example wireless communication system including a wearable device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB" or "gNB") has the full breadth of its ordinary meaning, and at least includes a wireless communication station installed at a fixed location and used to communicate as part of a wireless cellular communication system.

Macro cell—refers to various cells that cover a wide area range on the order of kilometers (or miles). May be referred to as a "base station", "eNB", and/or "gNB" depending on deployment.

Small cells—refers to various cells that cover a smaller area than a macro cell but a larger area than a femto/pico cell. Typically deployed in malls, airports, and neighborhoods.

Femto/Pico cell—refers to various cells that cover a small area on the order of meters (or feet). Typically deployed in offices, homes, and other relatively small areas as compared to macro cells and small cells.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as a small form factor device, which as an example may be a wearable device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA). The base station 102 (or similar network infrastructure) may also support other communication technologies, such as text messaging, e.g., SMS (Short Message Service) and similar text messaging technologies, such as iMessage, Facebook Messenger, Whatsapp, etc.

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), 5G-NR, HSPA, 3GPP2 CDMA2000 (e.g., 1×RTT, 1×EV-DO, HRPD, eHRPD), WiFi, WiMAX etc. One example of LTE or LTE-A communications may be VoLTE (Voice over LTE).

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, 5G-NR, WLAN (WiFi), Bluetooth, WiMAX, one or more global navigational satellite systems (GNSS, e.g., GPS or GLONASS), one and/or more mobile television broadcasting standards (e.g., ATSC-M/H), SMS, etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with communication capability, such as cellular communications capability. The UE 106B may be configured to communicate with the UE device 107, which may be referred to as a small form factor device or wearable device 107. The wearable device 107 may be any of various types of devices. Typically a wearable device that has a smaller form factor, and may have limited battery, output power and/or communications abilities relative to UEs 106. As one common example, the UE 106B may be a smart phone carried by a user, and the wearable device 107 may be a smart watch worn by that same user, or possibly a different user. Thus, as another example, in the operation described herein the UE 106B may be a smart phone carried by a first user, and the wearable device 107 may be a smart watch worn by a second, different user. The UE 106B and the wearable device 107 may communicate using any of various short-range communication protocols, such as Bluetooth, WiFi, etc.

The wearable device 107 may include communications capability, e.g., cellular communication capability, and hence may be able to directly communicate with cellular base station 102. However, since the wearable device 107 is possibly limited in one or more of its communication capabilities, output power, and/or battery, the wearable device 107 may in some instances selectively utilize the UE 106B as a proxy for communication purposes with the base station 102 and hence to the network 100. In other words, the wearable device 107 may selectively use the cellular communication capabilities of the UE 106B to conduct its cellular communications. The limitation on communication abilities of the wearable device 107 can be permanent, e.g., due to limitations in output power or the radio access technologies (RATs) supported, or temporary, e.g., due to conditions such as current battery status, inability to access a network, or poor reception.

Figure 2:
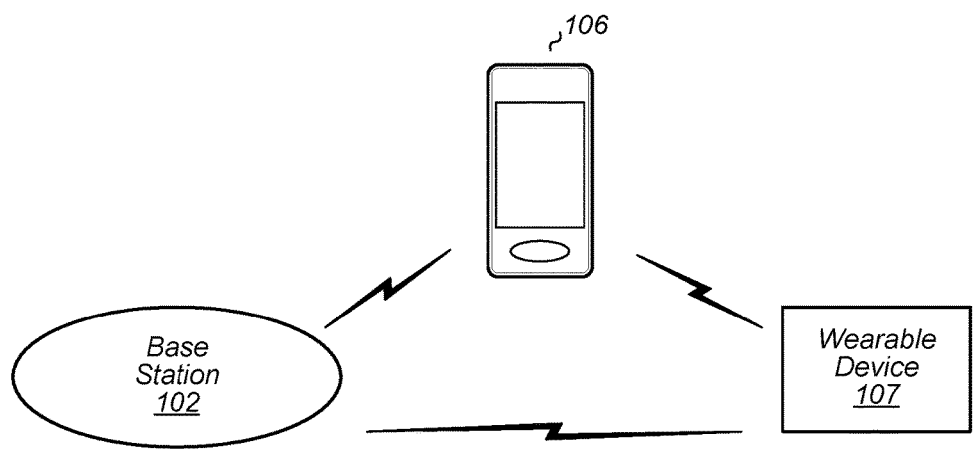
FIG. 2 illustrates an example system in which a wearable device can selectively either directly communicate with a cellular base station or utilize the cellular capabilities of an intermediate or proxy device such as a smart phone, according to some embodiments.

FIG. 2—Example System with a Wearable Device

FIG. 2 illustrates an example small form factor device 107 in communication with base station 102. The small form factor device 107 may be a wearable device such as a smart watch. The wearable device 107 may comprise cellular communication capability and be capable of directly communicating with the base station 102 as shown. When the wearable device 107 is configured to directly communicate with the base station, the wearable device may be said to be in "autonomous mode."

The wearable device 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the wearable device 107 may provide voice/data packets intended for the base station 102 over the short-range link to the UE 106, and the UE 106 may use its cellular functionality to transmit (or relay) this voice/data to the base station on behalf of the wearable device 107. Similarly, the voice/data packets transmitted by the base station and intended for the wearable device 107 may be received by the cellular functionality of the UE 106 and then may be relayed over the short-range link to the wearable device. As noted above, the UE 106 may be a mobile phone, a tablet, or any other type of hand-held device, a media player, a computer, a laptop or virtually any type of wireless device. When the wearable device 107 is configured to indirectly communicate with the base station using the cellular functionality of an intermediate or proxy device, the wearable device 107 may be said to be in "relay mode."

Various embodiments herein are described with respect to the wearable device 107 selectively using either its own cellular functionality (autonomous mode) to communicate with a base station, or using the cellular functionality of the UE 106 (relay mode) for communications, e.g., for 5G-NR, LTE, or VoLTE. However, embodiments described herein may also be used with other radio access technologies (RATs), such as to enable the wearable device 107 to selectively using either its own WiFi functionality (autonomous mode) to communicate with a WiFi access point, or use the WiFi functionality of the UE 106 (relay mode) for WiFi communications.

The wearable device 107 may include a processor that is configured to execute program instructions stored in memory. The wearable device 107 may perform any of the method embodiments described herein by executing such stored instructions. Alternatively, or in addition, the wearable device 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The wearable device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using 5G-NR, LTE (or LTE-Advanced) or Bluetooth, and separate radios for communicating using each of LTE-Advanced and Bluetooth. Other configurations are also possible.

The small form factor device (e.g., wearable device) 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the wearable device 107 is a smart watch or other type of wearable device. When the UE 106 is capable of being used by the wearable device 107 as a proxy, the UE 106 may be referred to as a companion device to the wearable device 107.

Figure 3:
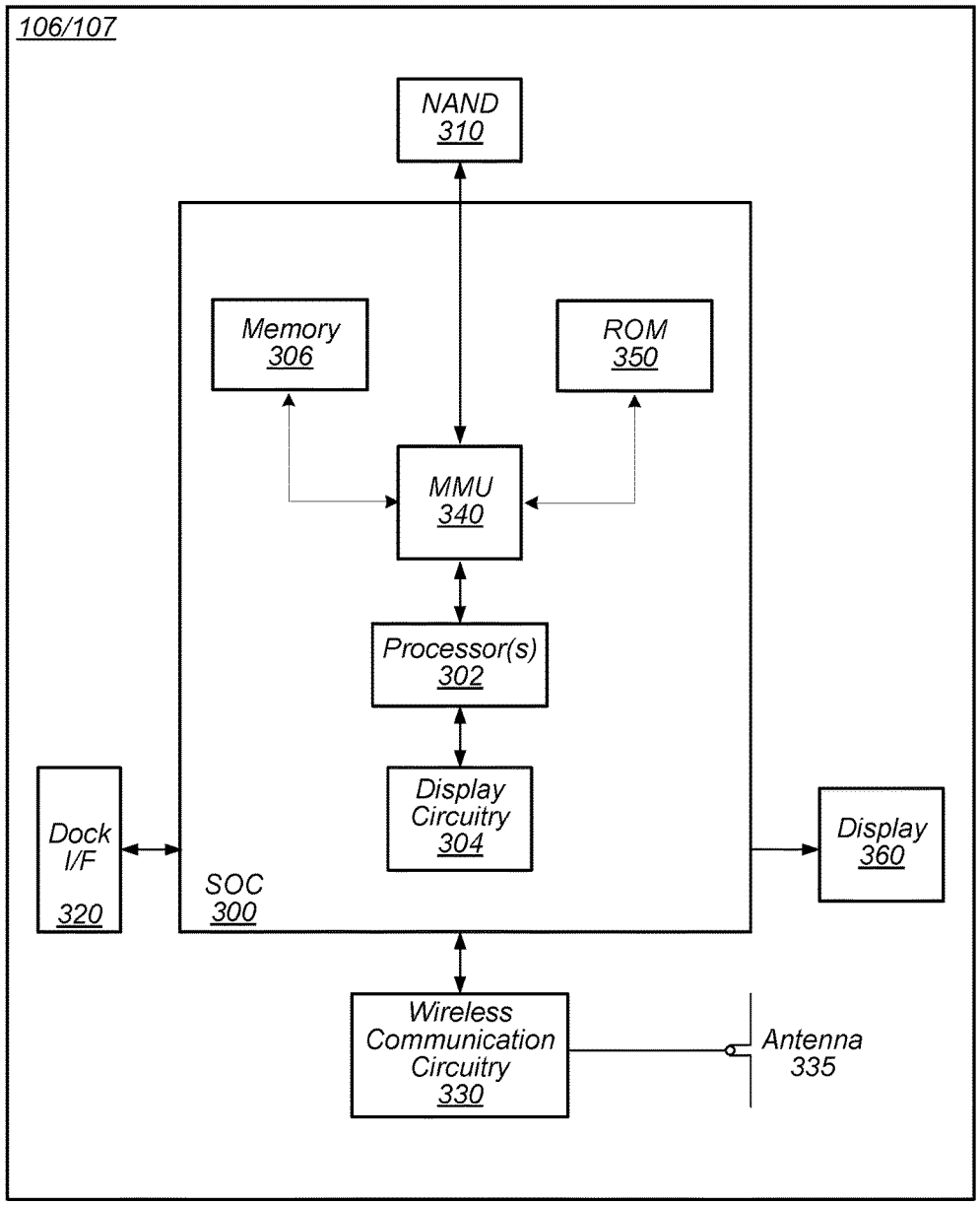
FIG. 3 is a block diagram illustrating an example UE, e.g., a smart phone or wearable device, according to some embodiments.
Figure 4:
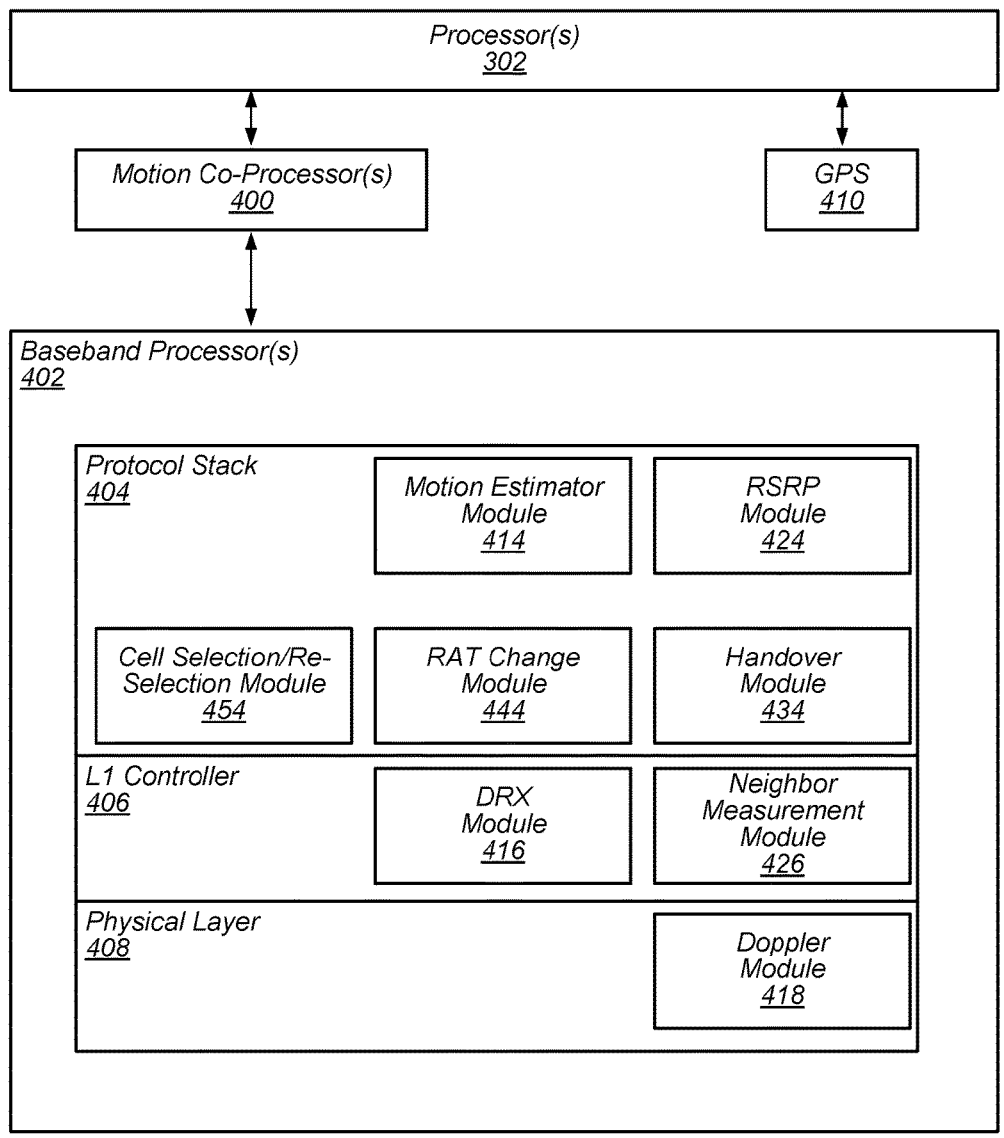
FIG. 4 illustrates an example system architecture of a UE configured to implement a motion estimation algorithm, according to some embodiments.

FIGS. 3-4—Example Block Diagrams of a UE Device

FIG. 3 illustrates one possible block diagram of a UE device 106 or a wearable device 107. As shown, the UE 106/107 may include a system on chip (SOC) 300, which may include portions for various purposes. For example, as shown, the SOC 300 may include processor(s) 302 which may execute program instructions for the UE 106/107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The UE device 106/107 may also include other circuits or devices, such as the display circuitry 304, radio 330, connector I/F 320, and/or display 360.

In the embodiment shown, ROM 350 may include a bootloader, which may be executed by the processor(s) 302 during bootup or initialization. As also shown, the SOC 300 may be coupled to various other circuits of the UE device 106/107. For example, the UE device 106/107 may include various types of memory, a connector interface 320 (e.g., for coupling to a computer system), the display 360, and wireless communication circuitry (e.g., for communication using 5G-NR, LTE, CDMA2000, Bluetooth, WiFi, NFC, GPS, etc.).

The UE device 106/107 may include at least one antenna, and in some embodiments multiple antennas, for performing wireless communication with base stations and/or other devices. For example, the UE device 106/107 may use antenna 335 to perform the wireless communication. As noted above, the UE 106/107 may in some embodiments be configured to communicate wirelessly using a plurality of wireless communication standards or radio access technologies (RATs).

As described herein, the UE device 106 and/or the wearable device 107 may include hardware and software components for implementing methods according to embodiments of this disclosure. The processor 302 of the UE device 106/107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

FIG. 4 illustrates an example system architecture of a UE configured to implement a motion estimation algorithm, according to some embodiments. The system architecture shown in FIG. 4 may be implemented on a UE such as UE 106/107 described above. As shown, processor(s) 302 may interface to a global positioning system (GPS) 410 and a motion co-processor(s) 400. The motion co-processor(s) 400 may interface to one or more motion sensors (e.g., accelerometers, gyroscopes, and so forth) and may estimate movement of the UE. In addition, the motion co-processor(s) 400 may interface with processor(s) 302 as well as with a baseband processor(s) 402 of the UE. In some embodiments, the motion co-processor(s) 402 may interface with the baseband processor(s) 402 via a universal asynchronous receiver transmitter (UART) driver. In some embodiments, baseband processor(s) 402 may include various components and modules of the UE. For example, baseband processor(s) 402 may include a protocol stack 404, a layer one (L1) controller 406, and/or a physical layer 408.

As shown, a protocol stack 404 of baseband processor(s) 402 may include one or more sub-components or modules that provide various parameters for motion estimation. For example, the protocol stack 404 may include a motion estimator module 414, a reference signal received power (RSRP) module 424, a handover module 434, a RAT change module 444, and/or a cell selection/re-selection module 454. The one or more modules may provide various parameters for motion estimation based on respective time windows and/or on demand. In other words, a module may provide a respective parameter periodically based on the module's time reference. For example, the RSRP module 424 may provide an RSRP measurement every 1.28 seconds, however, other modules (e.g., handover module 434, RAT change module 444, and/or cell selection/re-selection module 454) may provide parameters more or less frequently as compared to the RSRP measurement.

As shown, a L1 controller 406 of baseband processor(s) 402 may include one or more sub-components or modules that provide various parameters for motion estimation. For example, the L1 controller 406 may include a discontinuous reception cycle (DRX) module 416 and a neighbor cell measurement module 426. The one or more modules may provide various parameters for motion estimation based on respective time windows and/or on demand. In other words, a module may provide a respective parameter periodically based on the module's time reference.

As shown, a physical layer 408 of baseband processor(s) 402 may include one or more sub-components or modules that provide various parameters for motion estimation. For example, the physical layer 408 may include a Doppler module 418. The one or more modules may provide various parameters for motion estimation based on respective time windows and/or on demand. In other words, a module may provide a respective parameter periodically based on the module's time reference.

Figure 5:
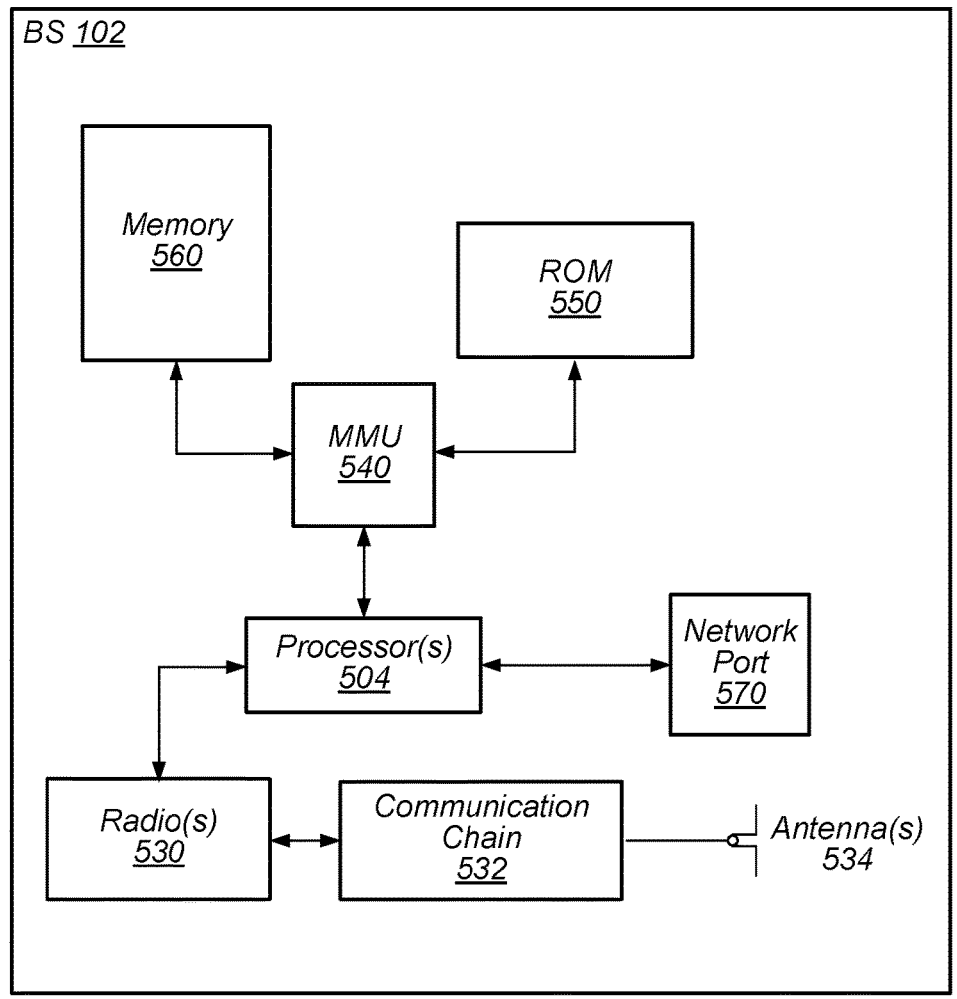
FIG. 5 illustrates an exemplary block diagram of a base station, according to some embodiments.

FIG. 5—Exemplary Block Diagram of a Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above in FIGS. 1 and 2.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless telecommunication standards, including, but not limited to, 5G-NR, LTE, LTE-A, UMTS, CDMA2000, WiFi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a WiFi radio for performing communication according to WiFi. In such a case, the base station 102 may be capable of operating as both an LTE base station and a WiFi access point. As another possibility, the base station 102 may include a multi-mode radio which is capable of performing communications according to any of multiple wireless communication technologies (e.g., LTE and WiFi).

The base station 102 may include hardware and software components for implementing or supporting implementation of features described herein.

UE Motion Estimation in Unconventional Cells

In addition to performing voice calls, UE devices are commonly used for communicating text messages and emails with remote devices. However, there are circumstances where it may be difficult for a user to effectively communicate via text message or email, e.g., the user may be driving such that the user is unable to (or should not) read and respond via text messaging or email. In these circumstances, the user experience may be improved if the UE is configured to enter a text-to-voice or vehicle mode, where the UE may automatically convert an incoming text message or email into audio and/or convert audio input from the user into text that can be sent to the remote device via text message or email while in the vehicle mode.

Motion estimation may be based on a variety of parameters available to UE devices. For example, a UE device may use data from a global positioning system (GPS) included in the UE device to determine motion. As another example, a UE device may use data from gyroscopes included in the UE device to determine motion. In addition, the UE device may perform Doppler measurements to estimate motion. Further, data collected from these systems and/or measurements may be augmented (and/or replaced) with data collected from various cellular parameters related to motion (e.g., cell transitions, cell change rate, cell change history, and so forth).

In some implementations, cellular parameters related to motion may be used to estimate motion and then trigger one or more higher power consumption methods of motion estimation (e.g., GPS, gyroscopes, Doppler measurements) to confirm the estimation. For example, the UE device may determine, based on motion estimation via cellular parameters, whether the user is currently driving an automobile, e.g., determine whether the UE device should enable or enter the vehicle mode; if the UE device determines that its velocity is above a predetermined threshold, where the predetermined threshold is indicative of a user of the UE device driving an automobile, the UE device may automatically enter vehicle mode. For example, the UE device may consider (or utilize) one or more cellular based parameters to determine if the velocity of the UE device is above the predetermined threshold (e.g., 10 mph, 15 mph, 20 mph, 25 mph, 30 mph, 45 mph, and so forth).

Such implementations may be ideal for typical macro cell deployments, but may trigger false positives (e.g., may determine that the UE device is in motion or above the threshold) when the UE device is in a small cell and/or femto/pico cell environment. The false positives may lead to the UE consuming power unnecessarily (e.g., by taking unnecessary Doppler measurements) as well as triggering the UE device to enter the vehicle mode in which some features (e.g., text and/or email) are disabled.

Figure 6:
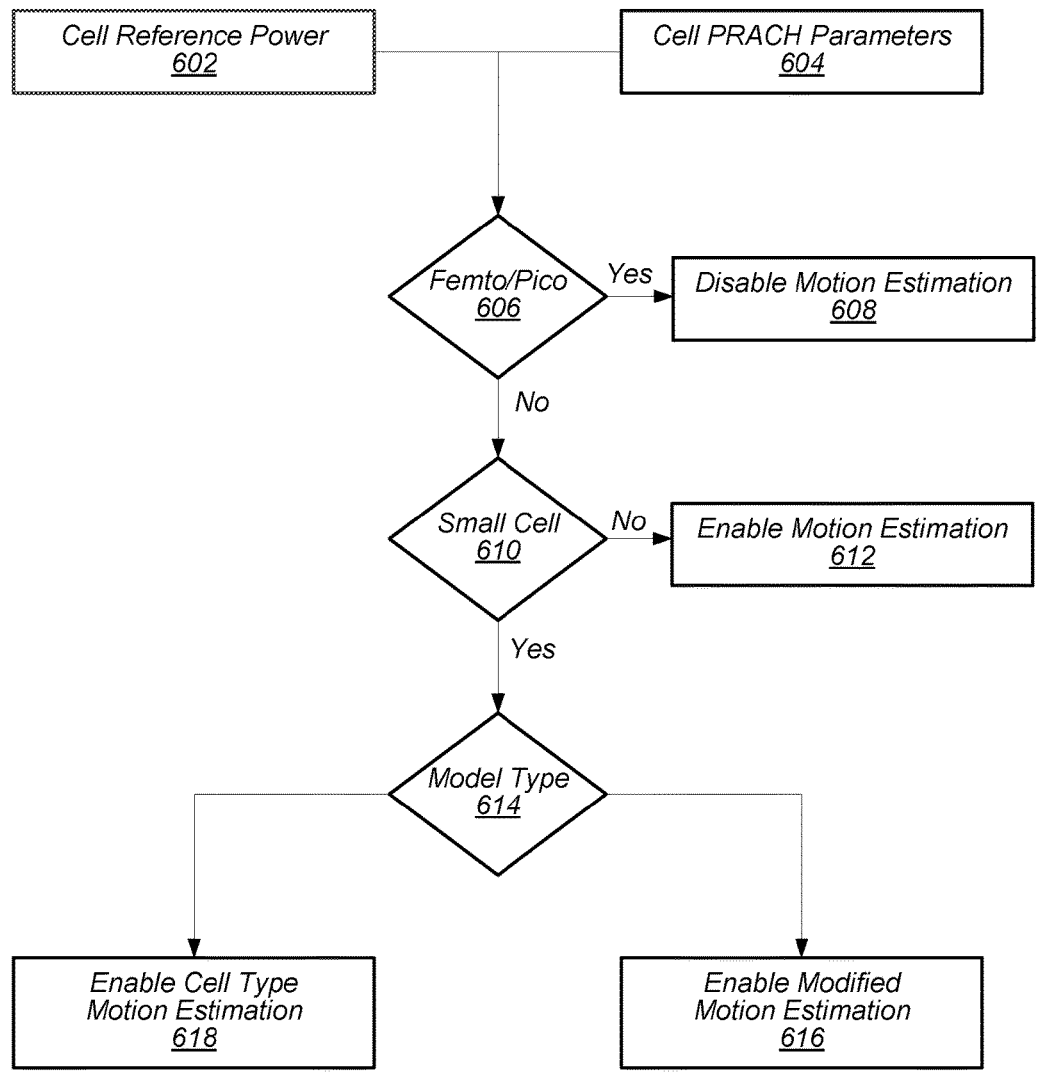
FIG. 6 illustrates a block diagram of an example of a process for estimating UE motion based on cell type, according to some embodiments.

In some embodiments, a UE (e.g., UE 106/107) may be configured to determine a cell type prior to entering a motion estimation algorithm. For example, a UE may use various cell parameters to identify a cell type and modify a cellular based motion estimation algorithm based on the cell type. For example, FIG. 6 illustrates a block diagram of an example of a process for estimating UE motion based on cell type, according to some embodiments. The process shown in FIG. 6 may be used in conjunction with any of the systems or devices shown in the above Figures, among other devices. In various embodiments, some of the process elements shown may be performed concurrently, in a different order than shown, or may be omitted. Additional process elements may also be performed as desired. As shown, this process may operate as follows.

At 602, cell reference power may be measured and/or determined. In some embodiments, an LTE system information block 2 (SIB2) may carry (or include) information regarding (or associated with) a reference signal transmitted by a cell. A power associated with the reference signal may vary depending on cell type. For example, reference signal power may be approximately 5 dBm for femto/pico cells but within a higher range for small cells and yet a higher range for macro cells.

At 604, cell physical random access channel (PRACH) parameters may be acquired and/or received. In some embodiments, parameters such as timing advance, PRACH configuration (or config) index, and/or preamble format may be associated with cell type.

At 606, cell reference power and/or PRACH parameters may be analyzed to determine whether a current cell (e.g., a cell currently serving the UE) is a femto/pico cell. If the current cell is a femto/pico cell (e.g., based, at least in part on the analysis of the cell reference power and/or PRACH parameters), the process may continue to 608 and the motion estimation algorithm (or engine) may be disabled, e.g., for a specified period of time. In some embodiments, the disablement of the motion estimation algorithm may allow for power savings at the UE. In other words, the UE may conserve power (e.g., battery charge) via disablement of the motion estimation algorithm. Note, as the first time period is increased (e.g., to a third or subsequent time period), power savings (or power conservation) may also increase.

If the current cell is not a femto/pico cell (e.g., based, at least in part on the analysis of the cell reference power and/or PRACH parameters), the process may continue to 610.

At 610, cell reference power and/or PRACH parameters may be analyzed to determine whether the current cell is a small cell. If the current cell is not a small cell (e.g., based, at least in part on the analysis of the cell reference power and/or PRACH parameters), the process may continue to 610 and motion estimation algorithm (or engine) may be enabled, e.g., for a specified period of time. If the current cell is a small cell (e.g., based, at least in part on the analysis of the cell reference power and/or PRACH parameters), the process may continue to 614.

At 614, a modified motion estimation model may be selected, e.g., the process may continue to either 616 or 618. If the process continues to 616, a modified motion estimation algorithm (or engine) may be enabled. In some embodiments, the modified motion estimation algorithm may clip (and/or attenuate and/or filter) one or more cellular based estimation parameters (e.g., such as reference signal received power (RSRP) fluctuations, cell reselections, cell rate of change, number of unique cells, and/or other cell history parameters) based (at least in part) on typical UE behavior in small cells. For example, the algorithm may clip (e.g., limit range of a parameter to a specified threshold) RSRP fluctuations such that the RSRP fluctuations used for motion estimation does not trigger an "in motion" result. In other words, the algorithm may adjust one or more input parameters used for motion estimation such that the results of the motion estimation algorithm indicate that the UE is stationary and/or not in a driving condition. Note that without clipping of the input parameters, the motion estimation algorithm may incorrectly estimate that the UE is in motion and/or is in a driving condition.

If the process continues to 618, the motion estimation algorithm (or engine) may include cell type as a parameter and the algorithm may adjust motion estimations based on cell type. For example, the motion estimation algorithm may be trained with cell type as an input parameter and coefficients (e.g., multipliers and/or weighting factors for each input parameter) chosen in the motion estimation algorithm may be adjusted based, at least in part, on cell type. In other words, the motion estimation algorithm may use a first set of coefficients when the cell type is a macro cell, and additional parameter sets when the cell type is not macro cell (e.g., when the cell type is small cell and/or pico/femto cell).

Figure 7:
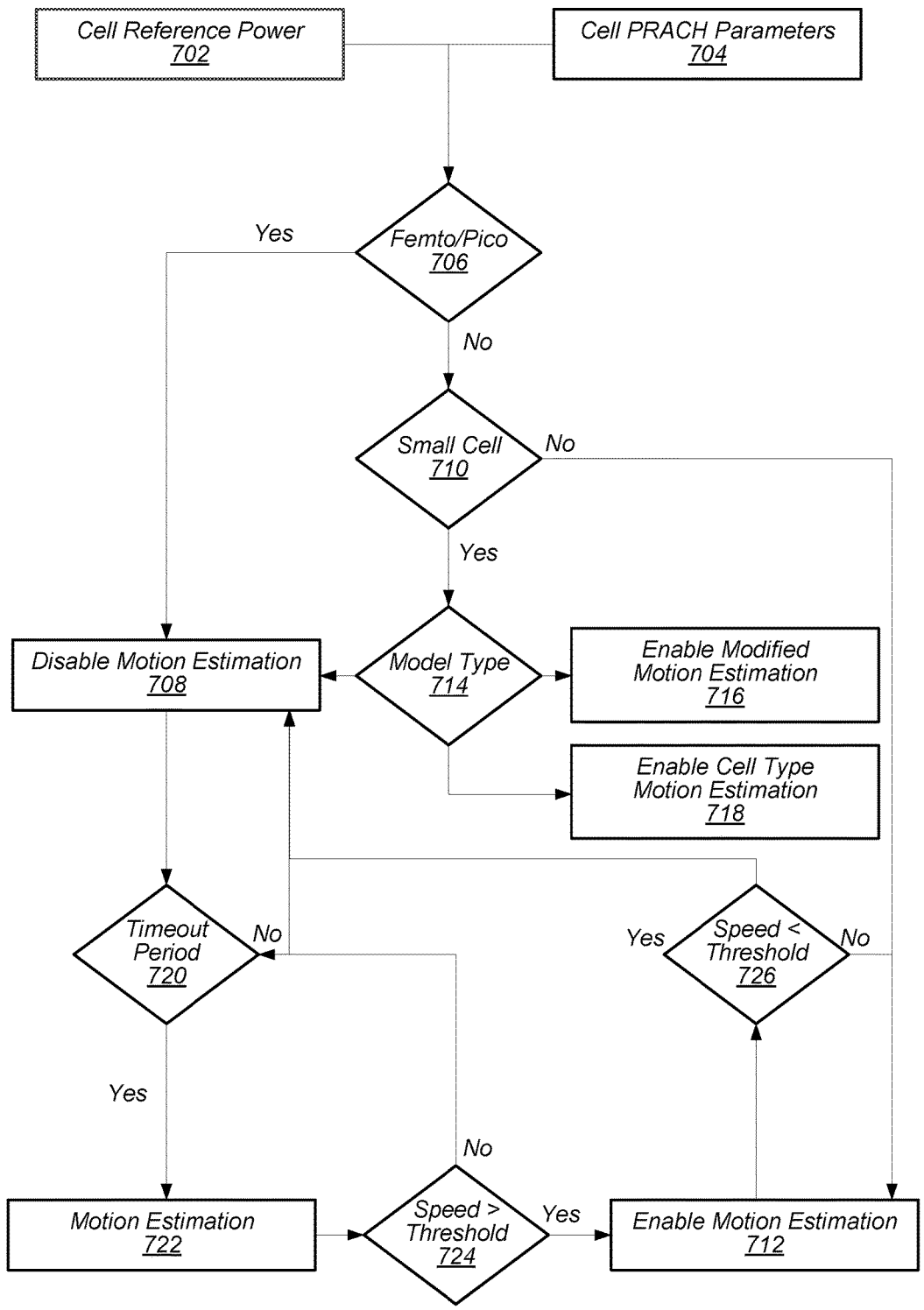
FIG. 7 illustrates a block diagram of another example of a process for estimating UE motion based on cell type, according to some embodiments.

As another example, FIG. 7 illustrates a block diagram of another example of a process for estimating UE motion based on cell type, according to some embodiments. The process shown in FIG. 7 may be used in conjunction with any of the systems or devices shown in the above Figures, among other devices. In various embodiments, some of the process elements shown may be performed concurrently, in a different order than shown, or may be omitted. Additional process elements may also be performed as desired. As shown, this process may operate as follows.

At 702, cell reference power may be measured and/or determined. In some embodiments, an LTE system information block 2 (SIB2) may carry (or included) information regarding (or associated with) a reference signal transmitted by a cell. A power associated with the reference signal may vary depending on cell type. For example, reference signal power may be approximately 5 dBm for femto/pico cells but within a higher range for small cells and yet a higher range for macro cells.

At 704, cell physical random access channel (PRACH) parameters may be acquired and/or received. In some embodiments, parameters such as timing advance, PRACH configuration (or config) index, and/or preamble format may be associated with cell type.

At 706, cell reference power and/or PRACH parameters may be analyzed to determine whether a current cell (e.g., a cell currently serving the UE) is a femto/pico cell. If the current cell is a femto/pico cell (e.g., based, at least in part on the analysis of the cell reference power and/or PRACH parameters), the process may continue to 708 and the motion estimation algorithm (or engine) may be disabled and the process may continue at 720. If the current cell is not a femto/pico cell (e.g., based, at least in part on the analysis of the cell reference power and/or PRACH parameters), the process may continue to 710.

At 710, cell reference power and/or PRACH parameters may be analyzed to determine whether the current cell is a small cell. If the current cell is not a small cell (e.g., based, at least in part on the analysis of the cell reference power and/or PRACH parameters), the process may continue and the motion estimation algorithm (or engine) may be enabled at 712. If the current cell is a small cell (e.g., based, at least in part on the analysis of the cell reference power and/or PRACH parameters), the process may continue to 714.

At 714, the process may continue to either 708, 716. or 718. If the process continues to 716, a modified motion estimation algorithm (or engine) may be enabled. In some embodiments, the modified motion estimation algorithm may clip (and/or attenuate and/or filter) one or more cellular based estimation parameters (e.g., such as reference signal received power (RSRP) fluctuations, cell reselections, cell rate of change, number of unique cells, and/or other cell history parameters) based (at least in part) on typical UE behavior in small cells. For example, the algorithm may clip (e.g., limit range of a parameter to a specified threshold) RSRP fluctuations such that the RSRP fluctuations used for motion estimation does not trigger an "in motion" result. In other words, the algorithm may adjust one or more input parameters used for motion estimation such that the results of the motion estimation algorithm indicate that the UE is stationary and/or not in a driving condition. Note that without clipping of the input parameters, the motion estimation algorithm may incorrectly estimate that the UE is in motion and/or is in a driving condition.

If the process continues to 718, the motion estimation algorithm (or engine) may include cell type as a parameter and the algorithm may adjust motion estimations based on cell type. For example, the motion estimation algorithm may be trained with cell type as an input parameter and coefficients (e.g., multipliers and/or weighting factors for each input parameter) chosen in the motion estimation algorithm may be adjusted based, at least in part, on cell type. In other words, the motion estimation algorithm may use a first set of coefficients when the cell type is a macro cell, and additional parameter sets when the cell type is not macro cell (e.g., when the cell type is small cell and/or pico/femto cell).

However, if the process continues to 708, the motion estimation engine may be disabled and a power savings process may begin at 720. In some embodiments, the power savings process may conserve power (e.g., battery charge) via disablement of the motion estimation algorithm.

At 720, the process may wait a specified period of time (e.g., a timeout period), prior to continuing to 722. The specified period of time (or timeout period) may be on the order of seconds, tens of seconds, minutes, tens of minutes, and so forth. In some embodiments, the period of time may be increased upon repeated (e.g., consecutive) re-entries into the power savings process (e.g., as further described below). In other words, the specified period of time may be extended (increased) upon consecutive (e.g., two or more) determinations that the UE is (or remains) in a small and/or pico/femto cell. In some embodiments, the specified period of time may continue to be extended (increased) upon subsequent consecutive determinations that the UE remains in a small and/or pico/femto cell. In such embodiments, a maximum time period may be specified after which the specified period of time may reset to an initial period of time. For example, in some embodiments, the initial period of time may be in the range of 1 to 30 seconds and upon consecutive determinations, the period of time may increase in increments of 30 seconds up to a maximum of 300 seconds. Once the maximum time limit has been obtained, the specified period of time may reset to the initial time period. Note, as the time period is increased power savings (or power conservation) may also increase.

At 722, after the specified time period has expired, a motion estimation (e.g., based on cellular parameters) may be conducted to estimate a speed of the UE. At 724, the speed of the UE may be compared to a threshold. In some embodiments, the threshold may include both a speed and a time duration. In other words, the threshold may be a specified speed for a specified time duration. For example, the threshold may be 5 mph maintained or exceeded for 15 seconds. As another example, the threshold may be 30 mph maintained or exceeded for 5 seconds. Note that these examples are exemplary only, and other speed and time values may be used. In some embodiments, during the motion estimation (e.g., at 722) and the threshold comparison (e.g., at 724), results from the motion estimation may be suppressed. In other words, the motion estimation results may not cause the UE to enter into a vehicle mode of operation.

At 724, if the UE speed has not exceeded the threshold, the process may return to 720 and wait the specified time period as described above. However, if the UE speed has exceeded the threshold, the process may continue to 712 and the motion estimation may be enabled. In other words, results of the motion estimation may no longer be suppressed, e.g., the UE may be enabled to enter the vehicle mode of operation. Once the motion estimation has been enabled, the process may periodically (e.g., every 5, 10, 15, 30, 45 seconds, and/or another specified time duration) compare the speed to the threshold at 726. If the speed remains above the threshold, the process may return to 712. If the speed has dropped below the threshold, the process may return to 708, e.g., the motion estimation engine may be disabled and the process may continue with a reset timeout period at 720.

Figure 8:
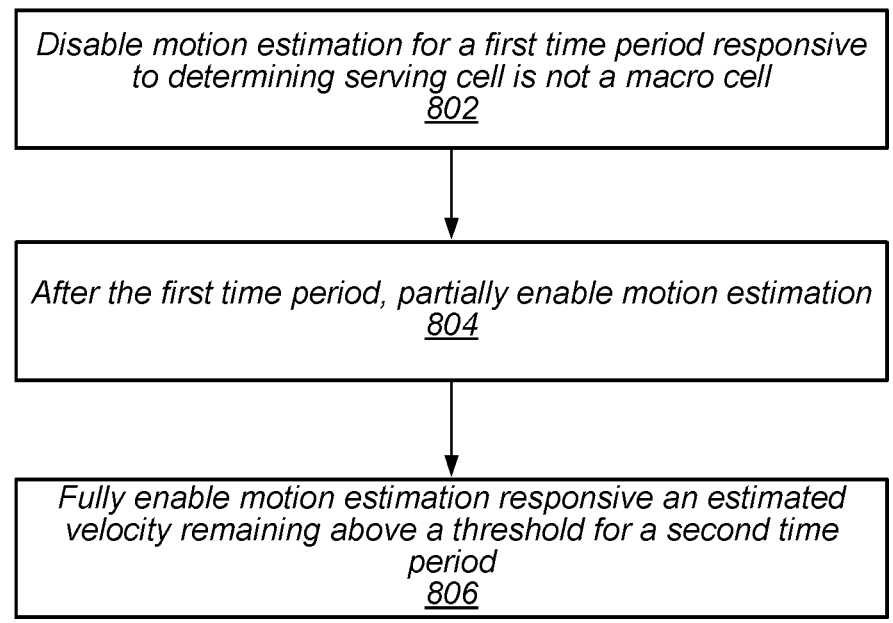
FIG. 8 illustrates a block diagram of an example of a method for estimating UE motion based on cell type, according to some embodiments.

FIG. 8 illustrates a block diagram of an example of a method for estimating UE motion based on cell type, according to some embodiments. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, an algorithm to estimate motion (e.g., a motion estimation algorithm or engine) of a UE, such as UE 106/107, may be disabled in response to determining that the UE is being served by a non macro cell (e.g., a small or pico/femto cell). In other words, in response to determining that a current cell serving the UE is not a macro cell, a motion estimation algorithm may be disabled. In some embodiments, the motion estimation algorithm may be disabled for at least a first time period. For example, when the motion estimation algorithm is disabled, the speed of the UE may not be estimated, measurements related to the estimation may be suspended, and a vehicle mode of the UE may not be activated. In some embodiments, the disablement of the motion estimation algorithm may allow for power savings at the UE. In other words, the UE may conserve power (e.g., battery charge) via disablement of the motion estimation algorithm. Note, as the first time period is increased (e.g., to a third or subsequent time period), power savings (or power conservation) may also increase.

At 804, the algorithm to estimate motion of the UE may be partially enabled, e.g., after the first time period. In other words, after the first time period has lapsed, the motion estimation algorithm may be partially enabled to estimate speed of the UE. In some embodiments, partial enablement of the motion estimation algorithm may allow the UE to estimate motion of the UE without entering into a vehicle mode (or a high mobility mode) in which certain features of the UE (e.g., such as text messaging, email messaging, and the like) are automatically disabled and/or other features of the UE are automatically enabled (e.g., such as voice to text and/or hands free modes of operation). In other words, when the motion estimation algorithm is partially enabled, the speed of the UE may be estimated for the second time period, measurements related to the estimation may be active during the second time period, and a vehicle mode of the UE may not be activated. In some embodiments, the speed may be estimated for a second time period. In some embodiments, the first time period may be greater than and/or equal to the second time period. In some embodiments, the first time period may be less than and/or equal to the second time period.

At 806, the algorithm to estimate motion of the UE may be fully enabled responsive to an estimated velocity (or speed) of the UE remaining above (or exceeding) a threshold for at least the second period of time. In other words, in response to the speed of the UE remaining above (or exceeding) a speed threshold for the second time period, the motion estimation algorithm may be fully enabled. In some embodiments, full enablement of the motion estimation algorithm may allow the UE may enter into the vehicle mode (or the high mobility mode) in which certain features of the UE (e.g., such as text messaging, email messaging, and the like) are automatically disabled and/or other features of the UE are automatically enabled (e.g., such as voice to text and/or hands free modes of operation).

In some embodiments, the algorithm to estimate motion of the UE may be fully disabled responsive to the estimated velocity (or speed of the UE not remaining above (or exceeding the threshold for at least the second period of time. In other words, in response to the speed of the UE not remaining above the speed threshold for the second time period, the motion estimation algorithm may be disabled. In some embodiments, the disablement of the motion estimation algorithm may be for at least a third time period. In some embodiments, the third time period may be greater than and/or equal to the first time period. In some embodiments, after expiration of the third time period, the motion estimation algorithm may be partially enabled (e.g., a second or subsequent time). In other words, after the third time period has lapsed, the motion estimation algorithm may be partially enabled to estimate speed of the UE. In some embodiments, in response to the speed of the UE remaining above the speed threshold for the second time period, the motion estimation algorithm may be fully enabled, e.g., as described above. In some embodiments, in response to the speed of the UE not remaining (or exceeding) the speed threshold for the second time period, the motion estimation algorithm may be disabled and the third time period may be altered (e.g., increased or decreased). In some embodiments, increase of the third time period may allow for further power savings by the UE.

In some embodiments, after full enablement of the motion estimation algorithm, the speed of the UE may be periodically compared to a second threshold. In other words, subsequent to fully enabling the motion estimation algorithm, the speed of the UE may be periodically compared to another (or second) speed threshold. The second speed threshold may be greater than, less than, and/or equal to the first speed threshold, in some embodiments. In some embodiments, in response to the speed of the UE not remaining above the second threshold for a fourth period of time, the motion estimation algorithm may be disabled for at least a fifth period of time. In some embodiments, the fifth period of time may be greater than, less than, and/or equal to the first and/or third period of times.

In some embodiments, a system information block may be received from the serving (or current) cell and may include information associated with (or regarding) cell reference power. In addition, cell physical random access channel (PRACH) parameters may be received from the serving (or current) cell. In some embodiments, a type of the serving (or current) cell may be determined, based at least in part, on the cell reference power information and/or the PRACH parameters. In some embodiments, the PRACH parameters may include one or more of (or at least one of) a timing advance, a PRACH configuration index, and/or a preamble format. In some embodiments, the type of the serving (or current) cell may include one of a macro cell, a small cell, a pico cell, and/or a femto cell.

In some embodiments, the speed of the UE may be estimated based on cellular based parameters. In other words, the motion estimation algorithm may base speed estimations of the UE on analysis of one or more cellular based parameters. In some embodiments, the cellular based parameters may include one or more (or at least one of) time adjustment information, downlink frame timing offset, uplink frame timing offset, random access channel (RACH) parameters related to cell size, reference signal received power (RSRP) delta, reference signal received quality (RSRQ) delta, signal to noise ratio (SNR) delta, signal to noise plus interference ratio (SINR) delta, received signal strength indicator (RSSI) delta, reference signal received power (RSRP) rate of change, reference signal received quality (RSRQ) rate of change, signal to noise ratio (SNR) rate of change, signal to noise plus interference ratio (SINR) rate of change, received signal strength indicator (RSSI) rate of change, cell change rate, a number of unique cells in a time window, a number of new cells in a time window, a total number of cells in a time window, rate of unique cells per time window, rate of new cells per time window, a number of handovers in a time window, a rate of change of handovers per time window, a number of cell selections in a time window, and/or a number of cell reselections in a time window.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user electronics device (UE), comprising:
   at least one antenna for performing wireless communication;
   at least one radio coupled to the at least one antenna, wherein the at least one radio is configured to perform cellular communication with a base station;
   one or more processors coupled to the at least one radio, wherein the one or more processors and the at least one radio are configured to perform wireless communications using the at least one antenna;
   wherein the one or more processors are configured to cause the UE to:
      in response to determining that a current cell serving the UE is not a macro cell, disable a motion estimation algorithm for at least a first time period;
      after the first time period has lapsed, partially enable the motion estimation algorithm to estimate speed of the UE; and
      in response to the speed of the UE remaining above a first speed threshold for a second time period, fully enable the motion estimation algorithm.

2. The UE of claim 1,
   wherein the one or more processors are further configured to cause the UE to:
      in response to the speed of the UE not remaining above the first speed threshold for the second time period, disable the motion estimation algorithm for at least a third time period.

3. The UE of claim 2,
   wherein the third time period is greater than the first time period.

4. The UE of claim 2,
   wherein the one or more processors are further configured to cause the UE to:
      after the third time period has lapsed, partially enable the motion estimation algorithm to estimate speed of the UE;
      in response to the speed of the UE remaining above the first speed threshold for the second time period, fully enable the motion estimation algorithm.

5. The UE of claim 1,
   wherein the one or more processors are further configured to cause the UE to:
      subsequent to fully enabling the motion estimation algorithm, periodically compare the speed of the UE to a second speed threshold; and
      in response to the speed of the UE not remaining above the second speed threshold for a third period of time, disable the motion estimation algorithm for at least a fourth period of time.

6. The UE of claim 1,
   wherein the one or more processors are further configured to cause the UE to:
      determine cell reference power from information received from the current cell in a system information block;
      receive cell physical random access channel (PRACH) parameters from the current cell; and
      determine based, at least in part, on the cell reference power information and the PRACH parameters, a type of the current cell.

7. The UE of claim 6,
   wherein the PRACH parameters comprise one or more of:
      a timing advance;
      PRACH configuration index; or
      preamble format.

8. The UE of claim 6,
   wherein the type of the current cell comprises one of:
      a macro cell;
      a small cell;
      a pico cell; or
      a femto cell.

9. The UE of claim 1,
   wherein the speed of the UE is estimated based on cellular based parameters.

10. An apparatus, comprising:
    a memory; and
    a processing element in communication with the memory, wherein the processing element is configured to:
       receive one or more parameters from a serving cell of a wireless device, wherein the one or more parameters are indicative of cell type;
       determine based, at least in part, on the one or more parameters, that the serving cell is one of a pico/femto cell or a small cell;
       in response to determining that the serving cell is one of a pico/femto cell or a small cell, disable a motion estimation algorithm for at least a first time period;
       after the first time period has lapsed, estimate motion of the wireless device for a second time period by partial enablement of the motion estimation algorithm; and
       in response to the speed of the wireless device not remaining above the speed threshold for the second time period, disable the motion estimation algorithm for at least a third time period.

11. The apparatus of claim 10,
    wherein the processing element is further configured to:
       in response to the speed of the UE remaining above a speed threshold for the second time period, enable the motion estimation algorithm.

12. The apparatus of claim 10,
    wherein the third time period is greater than the first time period.

13. The apparatus of claim 12,
wherein the processing element is further configured to:
   after the third time period has lapsed, partially enable the motion estimation algorithm to estimate speed of the wireless device; and
   in response to the speed of the wireless device remaining above the speed threshold for the second time period, fully enable the motion estimation algorithm.

14. The apparatus of claim 10,
wherein the one or more parameters comprise:
   cell reference power information received from the serving cell in a system information block; and
   cell physical random access channel (PRACH) parameters received from the serving cell.

15. The apparatus of claim 14,
wherein the PRACH parameters comprise one or more of:
   a timing advance;
   PRACH configuration index; or
   preamble format.

16. The apparatus of claim 10,
wherein the speed of the UE is estimated based on cellular based parameters.

17. A non-transitory computer readable memory medium storing program instructions executable by a processor of a user equipment device (UE) to:
   in response to determining that a current cell serving the UE is one of a pico/femto cell or a small cell, disable a motion estimation algorithm for at least a first time period;
   after the first time period has lapsed, partially enable the motion estimation algorithm to estimate speed of the UE; and
   in response to the speed of the UE remaining above a first speed threshold for a second time period, fully enable the motion estimation algorithm.

18. The non-transitory computer readable memory medium of claim 17,
wherein the program instructions are further executable to:
   in response to the speed of the UE not remaining above the first speed threshold for the second time period, disable the motion estimation algorithm for at least a third time period.

19. The non-transitory computer readable memory medium of claim 17,
wherein the program instructions are further executable to:
   subsequent to fully enabling the motion estimation algorithm, periodically compare the speed of the UE to a second speed threshold; and
   in response to the speed of the UE not remaining above the second speed threshold for a third period of time, disable the motion estimation algorithm for at least a fourth period of time.

20. The non-transitory computer readable memory medium of claim 17,
wherein, when the motion estimation algorithm is disabled, the speed of the UE is not estimated, measurements related to the estimation are suspended, and a vehicle mode of the UE cannot be activated; and
wherein, when the motion estimation algorithm is partially enabled, the speed of the UE is estimated for the second time period, measurements related to the estimation are active during the second time period, and a vehicle mode of the UE cannot be activated.

* * * * *